US007280709B2

(12) United States Patent  
Minami et al.

(10) Patent No.: US 7,280,709 B2  
(45) Date of Patent: Oct. 9, 2007

(54) SCAN LINE INTERPOLATION DEVICE, IMAGE PROCESSING DEVICE, IMAGE DISPLAY DEVICE, AND SCAN LINE INTERPOLATION METHOD

(75) Inventors: Koji Minami, Tokyo (JP); Masako Asamura, Tokyo (JP); Chihiro Sakuwa, Tokyo (JP); Toshihiro Gai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 828 days.

(21) Appl. No.: 10/743,131

(22) Filed: Dec. 23, 2003

(65) Prior Publication Data

US 2004/0246546 A1      Dec. 9, 2004

(30) Foreign Application Priority Data

Dec. 25, 2002  (JP)  ............................. 2002-373663  
Jun. 18, 2003  (JP)  ............................. 2003-173167

(51) Int. Cl.  
*G06K 9/54*  (2006.01)  
*H04N 1/46*  (2006.01)  
*H04N 7/01*  (2006.01)

(52) U.S. Cl. .................. 382/300; 358/525; 348/448

(58) Field of Classification Search ................ 382/263, 382/266, 278, 299, 300, 312; 358/1.2, 525, 358/532; 348/448, 452  
See application file for complete search history.

(56) References Cited

U.S. PATENT DOCUMENTS

| 5,347,599 | A | * | 9/1994 | Yamashita et al. | .......... 382/278 |
|---|---|---|---|---|---|
| 5,367,629 | A | * | 11/1994 | Chu et al. | .................... 382/253 |
| 5,886,745 | A | * | 3/1999 | Muraji et al. | ............... 348/448 |
| 6,262,773 | B1 | * | 7/2001 | Westerman | .................. 348/448 |
| 6,295,089 | B1 | * | 9/2001 | Hoang | ...................... 348/390.1 |
| 6,421,090 | B1 | | 7/2002 | Jiang et al. | |
| 6,757,022 | B2 | * | 6/2004 | Wredenhagen et al. | ..... 348/452 |
| 6,795,123 | B2 | * | 9/2004 | Gotanda et al. | ............ 348/448 |
| 6,940,557 | B2 | * | 9/2005 | Handjojo et al. | ........... 348/452 |
| 7,023,487 | B1 | * | 4/2006 | Adams | ........................ 348/448 |

FOREIGN PATENT DOCUMENTS

| JP | 3-179890 A | 8/1991 |
|---|---|---|
| JP | 2002-112203 A | 4/2002 |

* cited by examiner

*Primary Examiner*—Kanjibhai Patel  
(74) *Attorney, Agent, or Firm*—Birch, Stewart, Kolasch & Birch, LLP

(57) ABSTRACT

In the conversion of a video signal from interlaced to progressive scanning, the value of each pixel on an interpolated scan line is calculated by a procedure that includes calculating similarity values for pairs of pixel blocks located in point-symmetrical positions on opposite sides of the interpolated pixel; deciding whether similar edges are present in corresponding positions in the two pixel blocks constituting each pixel block pair; selecting an interpolation direction corresponding to the most similar pixel block pair among the pixel block pairs in which the similar edges are present; and using the pixels disposed at or closest to the centers of the two pixel blocks in this pixel block pair as reference pixels. Restricting diagonal interpolation directions to pixel block pairs in which similar edges are present improves the accuracy of the interpolation direction.

16 Claims, 11 Drawing Sheets

SCAN LINE INTERPOLATION DEVICE, IMAGE PROCESSING DEVICE, IMAGE DISPLAY DEVICE, AND SCAN LINE INTERPOLATION METHOD

BACKGROUND OF THE INVENTION

1. Field of the Invention

This invention relates to the interpolation of scan lines to convert the resolution of an image, and in particular to the interpolation of scan lines during the conversion of a video signal from interlaced scanning to progressive scanning.

2. Description of the Related Art

In the interlaced scanning system, one frame of a video signal is divided into two fields. When the frame is displayed, first one field is scanned; then the other field is scanned. The scan lines of the two fields occupy alternate positions on the display screen, so that a typical scan line of the first field is positioned adjacently between two scan lines of the second field, and a typical scan line of the second field is positioned adjacently between two scan lines of the first field. In the progressive scanning system, a frame comprises only one field, and each scan line in the field is adjacent to other scan lines in the same field.

The conversion of a video signal from interlaced scanning to progressive scanning requires the separate generation of two video signal frames from the first and second fields of an interlaced video signal. Scanning conversion is therefore performed by interpolating scan lines between the scan lines of each field of the interlaced video signal.

If the interlaced video signal is of a nonmoving image, so-called inter-field interpolation is generally performed: the scan lines in one field are inserted between the scan lines of the other field, so that the scan lines of both fields are used in each frame. If the interlaced video signal is of a moving image, so-called intra-field interpolation is performed: each frame is generated from the scan lines of just one field, the interpolated scan lines being generated by averaging the values of picture elements (pixels) on the adjacent scan lines. Examples are shown in FIG. 4 of Japanese Unexamined Patent Application Publication (hereinafter, JP) H3-179890 and FIG. 1 of JP 2002-1122003.

An image may also be divided into a nonmoving part and a moving part, and inter-field interpolation and intra-field interpolation may be performed to interpolate scan lines in the nonmoving part and moving part, respectively, as disclosed in JP H3-179890.

One scanning conversion system, disclosed in JP H3-179890, interpolates scan lines by generating pixels through vertical averaging of the pixel values on adjacent scan lines. If the image being converted includes diagonal lines or edges oriented at an angle to the scan line direction, however, pixel interpolation by vertical pixel averaging alone produces blurred or jagged boundaries.

Another scanning conversion system, disclosed in JP 2002-1122003, eliminates blurred or jagged boundary lines by selecting the most strongly correlated pair of pixels from among the pairs of pixels disposed at point-symmetrical positions on opposite sides of the pixel to be interpolated. Such a pair of pixels will be referred hereinafter to as a 'pixel pair'.

The conventional scanning conversion systems described above both have difficulties with images including fine lines oriented at small angles to the scan line direction. That is, it is difficult to generate the pixels for these fine lines correctly on an interpolated scan line.

In the scanning conversion system disclosed in JP H3-179890, in which interpolated scan lines are generated by averaging the video signals (pixel values) of vertically adjacent scan lines, an interpolated pixel on an interpolated scan line is given the average value of the pixel immediately above it and the pixel immediately below it. If the interpolated pixel lies on a very fine line, however, and the pixels immediately above and below the interpolated pixel do not form part of the very fine line, then the fine line will disappear at this point. After scanning conversion, fine lines oriented at small angles to the scan lines tend to be displayed as discontinuous lines with a dotted or dashed appearance.

In the scanning conversion system disclosed in JP 2002-1122003, in which correlations between pixel pairs are obtained, the level of correlation is determined from differences between the value of a pixel block including a predetermined number of pixels surrounding one pixel in the pixel pair and the value of a pixel block including the same number of pixels surrounding the other pixel in the pixel pair. The value of a pixel block (the pixel block value) is calculated as the sum of the pixel values in the block, or as a weighted sum of these pixel values. With this method, however, the direction of very fine diagonal lines may be unidentifiable because of identical differences between pixel block values in two or more pixel pairs, in which case the best pixel pair to use for generating the interpolated pixel cannot be selected unambiguously. After scanning conversion, the fine line may therefore be displayed as a discontinuous line.

SUMMARY OF THE INVENTION

An object of the present invention is to provide a scan line interpolation device and method by which scanning conversion can be performed without generating blurred or jagged boundaries at diagonal lines or edges and without generating discontinuities in fine lines that make a small angle with the scan lines.

The invented scan line interpolation device interpolates a scan line between two adjacent scan lines by using pixels on the two adjacent scan lines and at least two further scan lines adjacent to those scan lines. Each interpolated pixel is generated with reference to pixels selected from these scan lines by a pattern matching means, a similar edge decision means, and an interpolation direction decision means.

The pattern matching means calculates pattern similarity values for a plurality of pixel block pairs. The similarity value of each pixel block pair is calculated from the values of the pixels in its two constituent pixel blocks by, for example, summing the absolute differences between pixels in corresponding positions in the two pixel blocks.

The similar edge decision means decides whether similar edges are present in corresponding positions in the two pixel blocks constituting each pixel block pair. The decision is made on the basis of differences between the values of pairs of mutually adjacent pixels aligned perpendicular to the scan lines in the two pixel blocks.

From among the pixel block pairs in which similar edges are present, the interpolation direction decision means selects the pixel block pair having the pattern similarity value indicating the greatest similarity, thereby selecting an interpolation direction.

An interpolation means generates the interpolated pixel with reference to the pixels disposed closest to the centers of the two pixel blocks in the pixel block pair selected by the interpolation direction decision means.

DETAILED DESCRIPTION OF THE INVENTION

Figure 1:
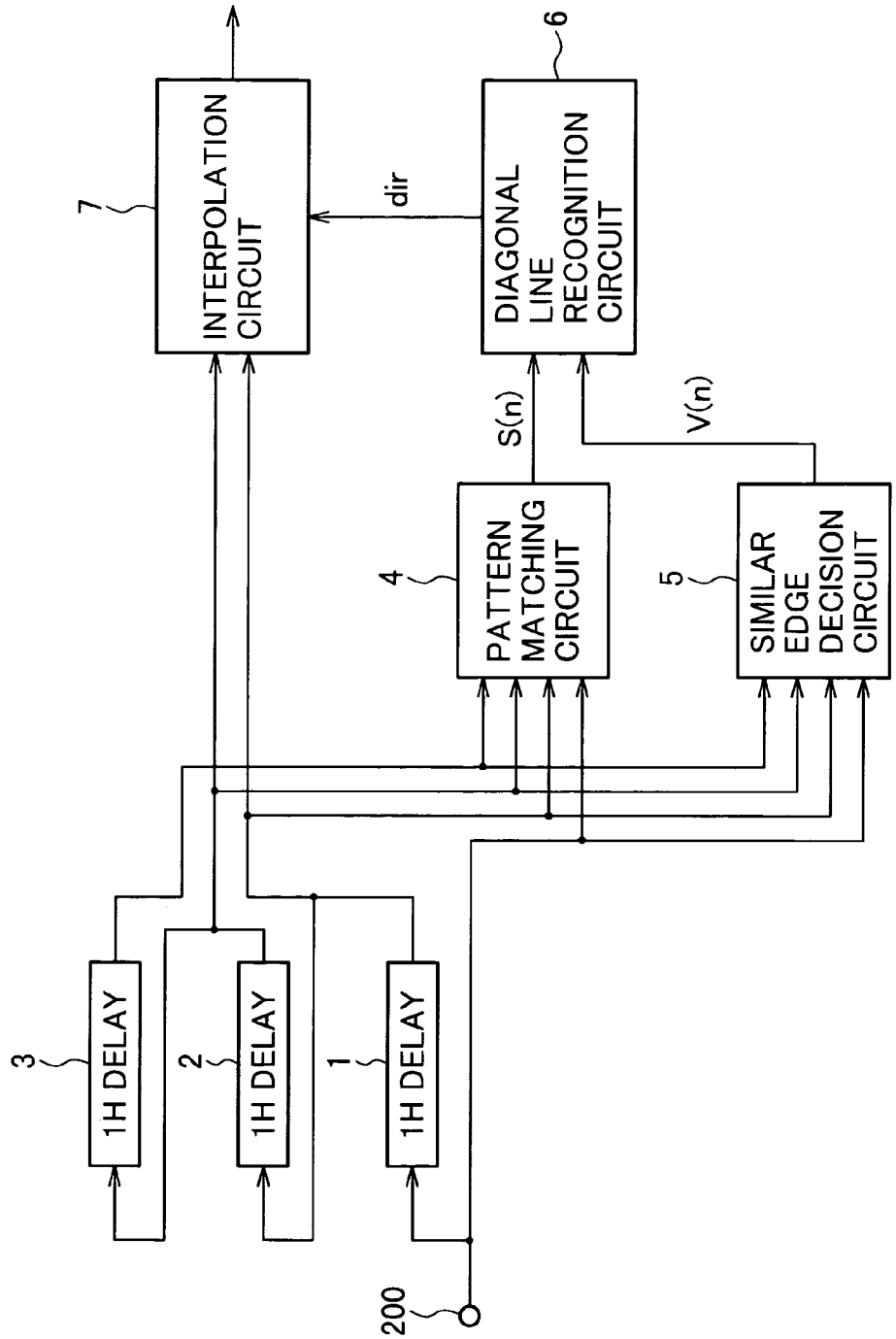
FIG. 1 is a block diagram illustrating a scan line interpolation device according to a first embodiment of the invention.

Embodiments of the invention will now be described with reference to the attached drawings, in which like elements are indicated by like reference characters. The terminology introduced above will be used to simplify the descriptions: the term 'pixel block' will mean a region consisting of a predetermined number of pixels, and the term 'pixel block pair' will mean two pixel blocks disposed at point-symmetrical positions on opposite sides of the interpolated pixel.

FIRST EMBODIMENT

Referring to FIG. 1, a scan line interpolation device according to a first embodiment of the invention includes first, second, and third delay circuits 1, 2, 3, a pattern matching circuit 4, a similar edge decision circuit 5, a diagonal line recognition circuit 6, an interpolation circuit 7, and an input terminal 200. The diagonal line recognition circuit 6 functions as an interpolation direction decision means.

An interlaced video signal input from the input terminal 200 is supplied to the first delay circuit 1, in which it is delayed by one horizontal scan period (1H), and to the pattern matching circuit 4 and the similar edge decision circuit 5. The video signal delayed by the first delay circuit 1 is supplied to the second delay circuit 2, in which it is further delayed by 1H, and to the pattern matching circuit 4, similar edge decision circuit 5, and interpolation circuit 7. The video signal delayed by the second delay circuit 2 is supplied to the third delay circuit 3, in which it is further delayed by 1H, and to the pattern matching circuit 4, similar edge decision circuit 5, and interpolation circuit 7. The video signal delayed by the third delay circuit 3 is supplied to the pattern matching circuit 4 and similar edge decision circuit 5.

Figure 2:
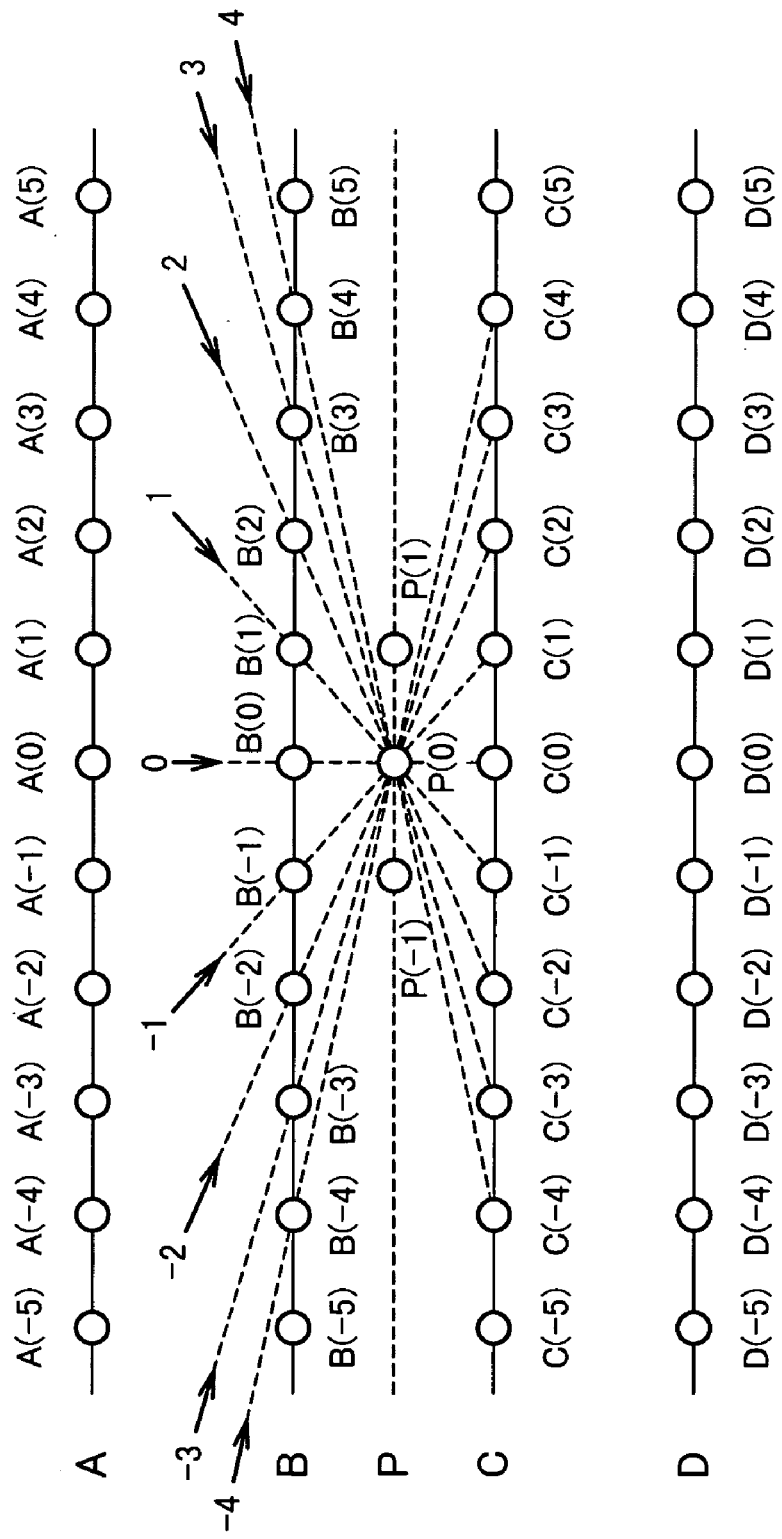
FIG. 2 schematically illustrates an arrangement of pixels in a video signal in the first embodiment.

FIG. 2 schematically illustrates an arrangement of pixels on four consecutive scan lines. Scan line A is formed by the video signal output from the third delay circuit 3; scan line B is formed by the video signal output from the second delay circuit 2; scan line C is formed by the video signal output from the first delay circuit 1; scan line D is formed by the video signal input from the input terminal 200.

The interpolation of scan line P between scan lines B and C will now be described. The value of interpolated pixel P0 on interpolated scan line P will be denoted P(0). The value of the pixel B0 immediately above interpolated pixel P0 on scan line B will be denoted B(0). The value of the pixel A0 immediately above pixel B0 on scan line A will be denoted A(0). The value of the pixel C0 immediately below interpolated pixel P0 on scan line C will be denoted C(0). The value of the pixel D0 immediately below pixel C0 on scan line D will be denoted D(0).

The n-th pixel from pixel A0 in the scanning direction (to the right in the drawings) on scan line A will be denoted An, and its pixel value will be denoted A(n), where n is an arbitrary positive integer. The n-th pixel from pixel A0 in the opposite direction (to the left in the drawings) will be denoted A-n, and its pixel value A(-n). Accordingly, the pixels on scan line A have values A(0), A(1), A(2), A(3) and so on in the scanning direction, and A(-1), A(-2), A(-3) and so on in the opposite direction. The pixels on scan line B have values B(0), B(1), B(2), B(3) and so on in the scanning direction, and B(-1), B(-2), B-3) and so on in the opposite direction. The pixels on scan line C have values C(0), C(1), C(2), C(3) and so on in the scanning direction, and C(-1), C(-2), C(-3) and so on in the opposite direction. The pixels on scan line D have values D(0), D(1), D(2), D(3) and so on in the scanning direction, and D(-1), D(-2), D(-3) and so on in the opposite direction.

The direction of the straight line connecting pixels Bn and C-n in point-symmetrical positions on opposite sides of interpolated pixel P0 will be referred to as direction n. For instance, the line through P0 connecting B0 and C0 has direction 0; the line through P0 connecting B1 and C-1 has direction 1; the line through P0 connecting B2 and C-2 has direction 2; the line through P0 connecting B-1 and C1 has direction −1; the line through P0 connecting B-2 and C2 has direction −2. FIG. 2 uses arrows to indicate the integer-valued directions from −4 to 4.

Figure 3:
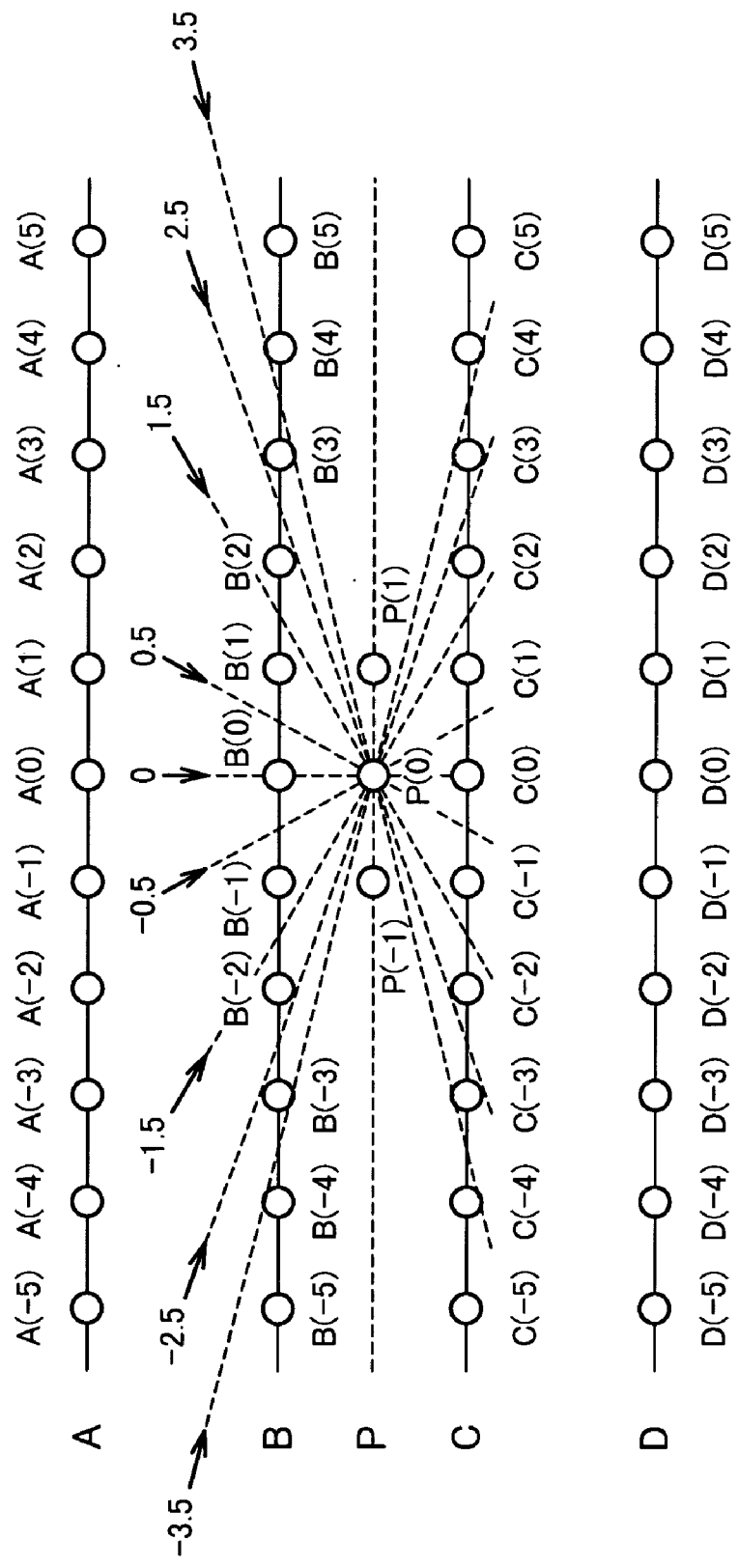
FIG. 3 schematically illustrates another arrangement of pixels in a video signal in the first embodiment.

The direction of the straight line connecting the midpoint between Bn and Bn+1 and the midpoint between C-n and C-(n+1) in point-symmetrical positions on opposite sides of interpolated pixel P0 will be referred to as direction n.5. For instance, the line through P0 connecting the midpoint between B0 and B1 and the midpoint between C0 and C-1 has direction 0.5; the line through P0 connecting the midpoint between B1 and B2 and the midpoint between C-1 and C-2 has direction 1.5; the line through P0 connecting the midpoint between B0 and B-1 and the midpoint between C0 and C1 has direction −0.5; the line through P0 connecting the midpoint between B-1 and B-2 and the midpoint between C1 and C2 has direction −1.5. FIG. 3 uses arrows to indicate the half-integer-valued directions from −3.5 to 3.5.

The function of the pattern matching circuit 4 will be described next. The pattern matching circuit 4 calculates the similarity values for a plurality of pixel block pairs disposed in point-symmetrical positions in directions −4 to 4 on opposite sides of the interpolated pixel P0. For an integer-valued direction n, the similarity value is obtained from a nine-pixel block centered on Bn and a nine-pixel block centered on C-n.

As an example, the calculation of a similarity value S(3) for the pixel block pair in direction 3 in FIG. 4 will be described. This pixel block pair comprises the two pixel blocks 401 and 402 enclosed in dash-dotted boxes.

Pixel block 401 includes nine pixels A2, A3, A4, B2, B3, B4, C2, C3, C4, with B3 disposed at the center. Pixel block 402 includes nine pixels B-4, B-3, B-2, C-4, C-3, C-2, D-4, D-3, D-2, with C-3 disposed at the center.

First, the absolute value of the difference between each pixel in pixel block 401 and the corresponding pixel in pixel block 402 is calculated, as follows.

$$d0 = |A(2) - B(-4)| \tag{1}$$

$$d1 = |A(3) - B(-3)| \tag{2}$$

$$d2 = |A(4) - B(-2)| \tag{3}$$

$$d3 = |B(2) - C(-4)| \tag{4}$$

$$d4 = |B(3) - C(-3)| \tag{5}$$

$$d5 = |B(4) - C(-2)| \tag{6}$$

$$d6 = |C(2) - D(-4)| \tag{7}$$

$$d7 = |C(3) - D(-3)| \tag{8}$$

$$d8 = |C(4) - D(-2)| \tag{9}$$

The similarity value S(3) for direction 3 is the total of these absolute differences d0 to d8.

$$S(3) = d0 + d1 + d2 + d3 + d4 + d5 + d6 + d7 + d8 \tag{10}$$

It can be seen from equations (1) to (10) that the similarity value S(3) approaches zero as the similarity between pixel blocks 401 and 402 increases, and that the similarity value S(3) increases as the similarity between the two pixel blocks decreases.

The pattern matching circuit 4 calculates similarity values for the directions n in the range from −4 to 4, and supplies all the calculated similarity values S(n) to the diagonal line recognition circuit 6.

The similarity value S(3) may also be obtained as a weighted sum of d0 to d8, a higher weight being assigned to the difference between the central pixels than to the differences between the surrounding pixels, as shown below.

$$S(3) = 0.1 \times d0 + 0.1 \times d1 + 0.1 \times d2$$

$$+ 0.1 \times d3 + 0.2 \times d4 + 0.1 \times d5$$

$$+ 0.1 \times d6 + 0.1 \times d7 + 0.1 \times d8 \tag{11}$$

Figure 4:
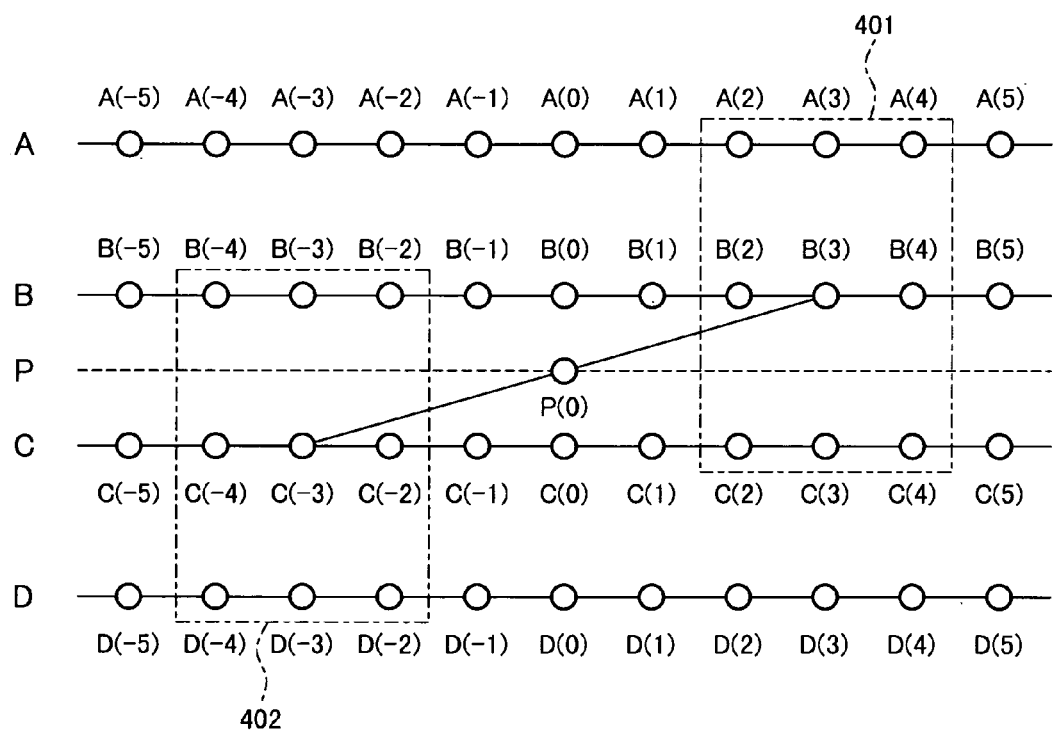
FIG. 4 illustrates pixel blocks that can be used in generating an interpolated pixel.
Figure 5:
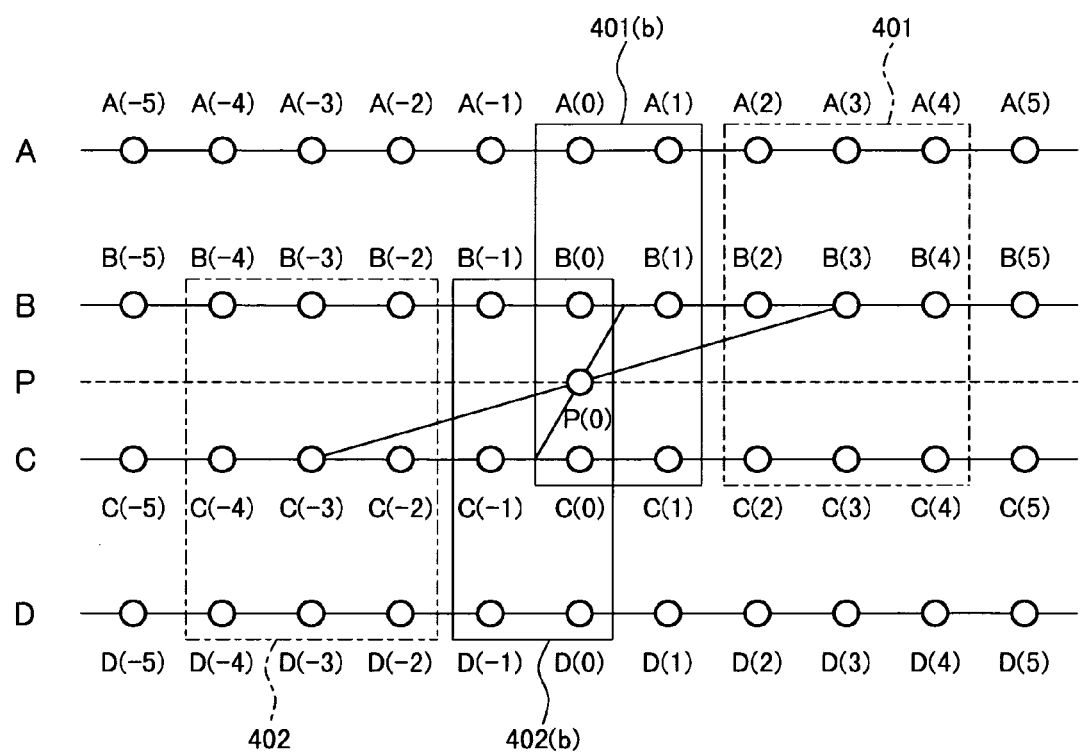
FIG. 5 illustrates other pixel blocks that can be used in generating an interpolated pixel.
Figure 6:
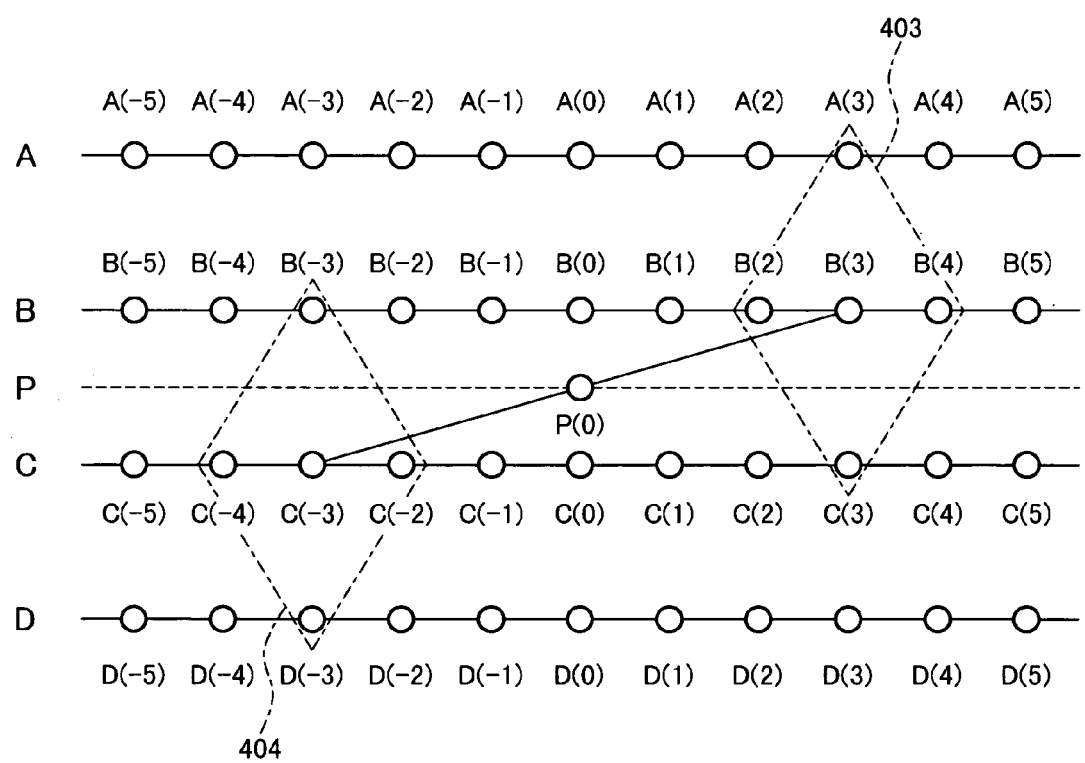
FIG. 6 illustrates further pixel blocks that can be used in generating an interpolated pixel.
Figure 7:
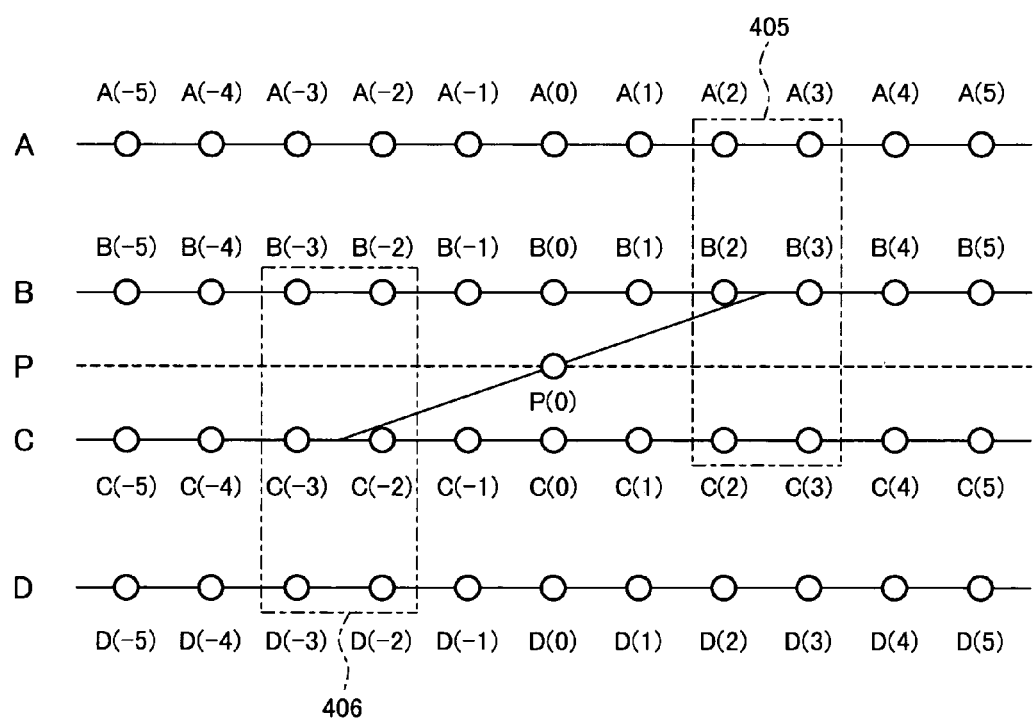
FIG. 7 illustrates still further pixel blocks that can be used in generating an interpolated pixel.

The pixel blocks used to calculate a similarity value need not always be rectangular blocks three pixels wide by three pixels high as shown in FIG. 4. The pixel blocks may be rectangular blocks two pixels wide by three pixels high, as shown in FIGS. 5 and 7, or rhombic blocks, as shown in FIG. 6.

The calculation of similarity values need not be carried out as indicated above. Any calculation method that numerically expresses the similarity of the patterns of pixel values in the two pixel blocks may be used.

The pixel blocks constituting different pixel block pairs may include different numbers of pixels. In FIG. 5, for example, the nine-pixel blocks 401, 402 centered on B3 and C-3 may be used to calculate a similarity value for direction 3, and the six-pixel blocks 401(*b*), 402(*b*) centered on the midpoint between B0 and B1 and the midpoint between C0 and C-1 may be used to calculate a similarity value for direction 0.5. The absolute value of the difference between each pixel in pixel block 401(*b*) and the corresponding pixel in pixel block 402(*b*) is calculated as follows.

$$d0(b) = |A(0) - B(-1)| \tag{1-b}$$

$$d1(b) = |A(1) - B(0)| \tag{2-b}$$

$$d2(b) = |B(0) - C(-1)| \tag{3-b}$$

$$d3(b) = |B(1) - C(0)| \tag{4-b}$$

$$d4(b) = |C(0) - D(-1)| \tag{5-b}$$

$$d5(b) = |C(1) - D(0)| \tag{6-b}$$

If the total of d0 to d8 in equations (1) to (9) is used as the similarity value S(3) for direction 3 and the total of d0(*b*) to d5(*b*) in equations (1-b) to (6-b) is used as the similarity value S(0.5) for direction 0.5, then similarity value S(3) is the sum of nine differences, while similarity value S(0.5) is the sum of only six differences. Therefore, before the two similarity values are compared, they are multiplied by coefficients determined by the number of pixels per block, such as 1/9 for a nine-pixel block and 1/6 for a six-pixel block.

$$S(3) = (d0 + d1 + d2 + d3 + d4 + d5 + d6 + d7 + d8) \times 1/9 \tag{12}$$

$$S(0.5) = (d0(b) + d1(b) + d2(b) + d3(b) + d4(b) + d5(b)) \times 1/6 \tag{13}$$

These weighted similarity values S(3) and S(0.5) also approach zero as the similarity between the pixel blocks being compared increases, and increase as the similarity between the pixel blocks decreases. The pattern matching circuit 4 calculates similarity values S(n) in this way for all integer-valued and half-integer-valued directions n from −4 to 4, and supplies all the calculated similarity values to the diagonal line recognition circuit 6.

The function of the similar edge decision circuit 5 will next be described. The similar edge decision circuit 5 decides whether similar edges are present in the two pixel blocks constituting each pixel block pair. The operation of the similar edge decision circuit 5 for deciding the presence or absence of similar edges will be described with reference to pixel blocks 401 and 402 in FIG. 4.

The similar edge decision circuit 5 calculates differences between the values of pairs of adjacent pixels at, above, and below the centers of these pixel blocks. Each pair of pixels is vertically aligned with the center of the block, thus being aligned perpendicular to the scan lines. For pixel block 401, the following two differences are calculated.

$$v1 = A(3) - B(3) \tag{14}$$

$$v2 = B(3) - C(3) \tag{15}$$

For the other pixel block 402, the following two differences are calculated.

$$v3 = B(-3) - C(-3) \tag{16}$$

$$v4 = C(-3) - D(-3) \tag{17}$$

Then the similar edge decision circuit 5 checks whether the following conditions 1-1 and 1-2 are satisfied, where Th is a predetermined threshold:

Condition 1-1: |v1| is greater than Th; |v3| is greater than Th; and v1 and v3 have the same sign.

Condition 1-2: |v2| is greater than Th; |v4| is greater than Th; and v2 and v4 have the same sign.

If either condition 1-1 or condition 1-2 is satisfied, the similar edge decision circuit 5 decides that similar edges are present in pixel blocks 401 and 402, sets a signal V(3) to '1' to indicate the decision result, and supplies this signal value to the diagonal line recognition circuit 6. If neither condition 1-1 nor condition 1-2 is satisfied, the similar edge decision circuit 5 decides that similar edges are not present in pixel blocks 401 and 402, sets signal V(3) to '0', and supplies this signal value to the diagonal line recognition circuit 6.

For each integer n from −4 to 4, the similar edge decision circuit 5 uses conditions 1-1 and 1-2 to decide whether similar edges are present in the two pixel blocks constituting the pixel block pair aligned in direction n, sets a signal V(n) to '0' or '1' to indicate the result of the decision, and supplies the signal value V(n) to the diagonal line recognition circuit 6.

The same decision procedure can be used for the five-pixel blocks shown in FIG. 6. A slightly modified procedure can be used for pixel block pairs aligned in half-integer directions, such as the six-pixel blocks in FIG. 7.

Further modifications of the similar edge decision procedure are also possible. For example, the decision can be based on variations in the values of vertically aligned triplets of pixels instead of variations in the values of vertically aligned pairs of pixels.

The operation of the diagonal line recognition circuit 6 will now be described. The diagonal line recognition circuit 6 receives the similarity values S(n) from the pattern matching circuit 4 and similar edge decision signals V(n) from the similar edge decision circuit 5 for all directions n from −4 to 4. If any similar edge decision signal V(n) is set to '1', indicating that similar edges are present, then from among all directions n for which V(n) is set to '1', the diagonal line recognition circuit 6 selects the direction n having the similarity value S(n) nearest zero (denoting the greatest similarity), and sends this direction value n to the interpolation circuit 7 as a direction signal (dir), indicating that there is a diagonal line or edge oriented in direction n. If all of the similar edge decision signals V(n) are '0', indicating that no similar edges are present, the direction signal is set to zero (dir=0) to indicate that there is no diagonal line or edge.

Next, the operation of the interpolation circuit 7 will be described. The interpolation circuit 7 uses the direction signal (dir) received from the diagonal line recognition circuit 6 to select the pixels on scan lines B and C from which to generate the interpolated pixel P0. If the value of the direction signal is an integer n, the value P(0) of the interpolated pixel P0 is normally calculated from pixel values B(n) and C(−n) by the following formula:

$$P(0)=\{B(n)+C(-n)\}/2 \qquad (19)$$

If the value of the direction signal is three (dir=3), for example, the value P(0) of pixel P0 is calculated from the values B(3) and C(−3) of pixels B3 and C-3.

$$P(0)=\{B(3)+C(-3)\}/2 \qquad (18)$$

If there are no pixels at the centers of the pixel blocks corresponding to direction n (for example, if n is not an integer), the pixels on scan lines B and C closest to the centers of the blocks are used instead. For the example shown in FIG. 7, the value P(0) of interpolated pixel P0 is calculated from the mean value of pixels B2 and B3 on scan line B and the mean value of pixels C-2 and C-3 on scan line C.

$$P(0)=\{(B(2)+B(3))/2+(C(-2)+C(-3))/2\}/2 \qquad (20)$$

More generally, if the value of the direction signal (dir) is n.5, the value P(0) of interpolated pixel P0 is calculated as follows:

$$P(0)=\{(B(n)+B(n+1))/2+(C(-n)+C(-n-1))/2\}/2 \qquad (21)$$

The scan line interpolation device of the first embodiment can accurately determine the direction of a line even if the line has a narrow width and is oriented at a small angle to the scan lines, because the determination is made on the basis of both pattern similarity and edge similarity of the two pixel blocks constituting a pixel block pair. In comparison with the conventional conversion system in which the directions of diagonal lines and edges are determined from pixel block values, the scan line interpolation device of the first embodiment can significantly reduce blurred or jagged edges and reduce discontinuities in fine lines.

The scan line interpolation device of the first embodiment has been described as hardware, but needless to say, it can be implemented in software.

SECOND EMBODIMENT

The second embodiment is identical to the first embodiment, except that in order to improve direction identification accuracy, the diagonal line recognition circuit 6 is modified to select the direction dir1 having the smallest similarity value S(n) (the greatest similarity) and the direction dir2 having the second smallest similarity value S(n) (the second greatest similarity), from among the directions for which the similar edge decision signal V(n) is set to '1'. If the absolute value of the difference between the similarity values of dir1 and dir2 does not exceed a predetermined amount, the diagonal line recognition circuit 6 identifies dir1 as the diagonal line direction and outputs the direction signal accordingly (dir=dir1). Otherwise, the diagonal line recognition circuit 6 decides that there is no diagonal line or edge, and sends the interpolation circuit 7 a zero direction signal (dir=0).

THIRD EMBODIMENT

In the scan line interpolation device of the first or second embodiment, the diagonal line recognition circuit may occasionally recognize a diagonal line or edge to which the interpolated pixel does not belong because the interpolated pixel forms part of a small intervening object. In this case the interpolated pixel should be generated from other pixels in the intervening object, more specifically, from the pixels immediately above and below the interpolated pixel. To deal with this case, the third embodiment adds an exception decision circuit to the configuration of the first or second embodiment.

Figure 8:
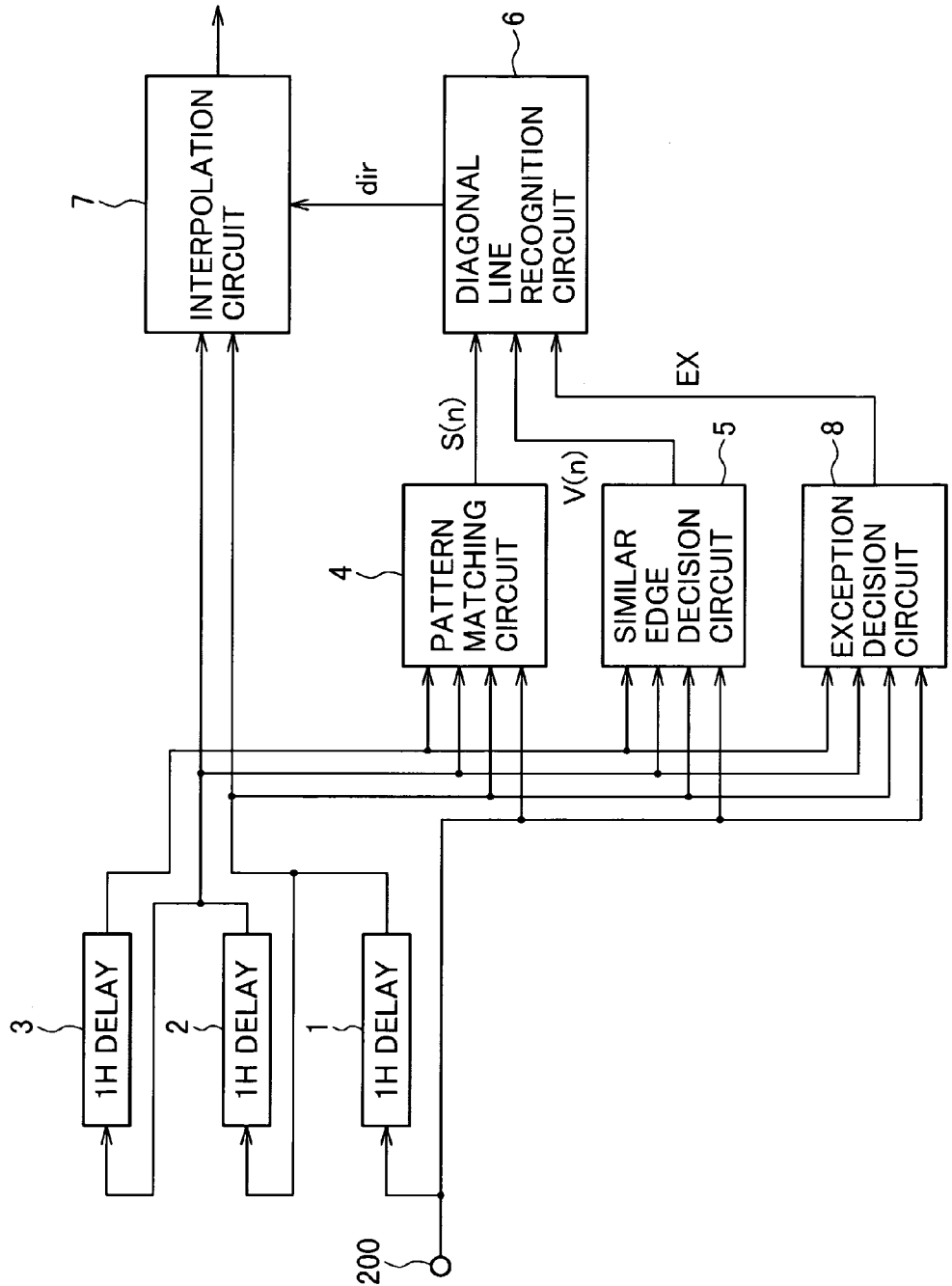
FIG. 8 is a block diagram illustrating a scan line interpolation device according to a third embodiment of the invention.

FIG. 8 is a block diagram illustrating the scan line interpolation device in the third embodiment. The delay circuits 1, 2, 3, pattern matching circuit 4, similar edge decision circuit 5, and interpolation circuit 7 are the same as in the first embodiment and will not be described below. The diagonal line recognition circuit 6 is modified to accept input from the newly added exception decision circuit 8.

The exception decision circuit 8 receives the video signal input from the input terminal 200 and the video signals output from the first, second, and third delay circuits 1, 2, 3, and performs subtraction operations to obtain the following quantities:

$$hl1 = A(-1) - A(0) \quad (22)$$

$$hl2 = B(-1) - B(0) \quad (23)$$

$$hl3 = C(-1) - C(0) \quad (24)$$

$$hl4 = D(-1) - D(0) \quad (25)$$

$$hr1 = A(1) - A(0) \quad (26)$$

$$hr2 = B(1) - B(0) \quad (27)$$

$$hr3 = C(1) - C(0) \quad (28)$$

$$hr4 = D(1) - D(0) \quad (29)$$

The exception decision circuit 8 then checks whether the following conditions 2-1 to 2-6, 3-1, and 3-2 are satisfied, where Th2 and Th3 are predetermined thresholds:

Condition 2-1: |hl1| is greater than Th2; |hl2| is greater than Th2; and hl1 and hl2 have the same sign.

Condition 2-2: |hl2| is greater than Th2; |hl3| is greater than Th2; and hl2 and hl3 have the same sign.

Condition 2-3: |hl3| is greater than Th2; |hl4| is greater than Th2; and hl3 and hl4 have the same sign.

Condition 2-4: |hr1| is greater than Th2; |hr2| is greater than Th2; and hr1 and hr2 have the same sign.

Condition 2-5: |hr2| is greater than Th2; |hr3| is greater than Th2; and hr2 and hr3 have the same sign.

Condition 2-6: |hr3| is greater than Th2; |hr451| is greater than Th2; and hr3 and hr4 have the same sign.

Condition 3-1: |hl2| is greater than Th3; |hl3| is greater than Th3; and hl2 and hl3 have opposite signs.

Condition 3-2: |hr2| is greater than Th3; |hr3| is greater than Th3; and hr2 and hr3 have opposite signs.

Conditions 2-1 to 2-6 indicate the presence of a vertical edge at one or both of the pixels vertically adjacent to the interpolated pixel P0. Given the presence of such a vertical edge, if a diagonal line or edge is also recognized, the interpolated pixel P0 is likely to belong to a small object interrupting the diagonal line or edge. Conditions 3-1 and 3-2 also indicate that any recognized diagonal line or edge is likely to be interrupted in the immediate vicinity of the interpolated pixel.

Accordingly, if at least one of conditions 2-1 to 2-6, 3-1, and 3-2 is satisfied, the exception decision circuit 8 sets an exception decision signal EX to '1' to instruct the diagonal line recognition circuit 6 to disregard diagonal lines and edges. If none of conditions 2-1 to 2-6, 3-1, and 3-2 is satisfied, the exception decision circuit 8 sets the exception decision signal EX set to '0'. The exception decision signal EX is sent to the diagonal line recognition circuit 6.

If the exception decision signal EX is '1', the diagonal line recognition circuit 6 sets the direction signal to zero (dir=0) regardless of the similarity values S(n) supplied from the pattern matching circuit 4 and the similar edge decision signals V(n) supplied from the similar edge decision circuit 5. The zero direction signal informs the interpolation circuit 7 that no diagonal line or edge is present.

If the exception decision signal EX is '0', the diagonal line recognition circuit 6 selects an interpolation direction on the basis of the similarity values S(n) supplied from the pattern matching circuit 4 and the similar edge decision signals V(n) supplied from the similar edge decision circuit 5 as in the first or second embodiment, sets the direction signal (dir) accordingly, and outputs the direction signal to the interpolation circuit 7.

The operation of the exception decision circuit described above may be modified. For example, the exception decision circuit may examine only the pixels on the two scan lines adjacent to the interpolated pixel, calculate only hl2, hr2, hl3, and hr3, and test only conditions 2-2, 2-5, 3-1, and 3-2, or modified forms thereof.

The exception decision circuit in the scan line interpolation device of the third embodiment enables pixels in small objects to be interpolated correctly even when the small object interrupts a diagonal line or edge.

FOURTH EMBODIMENT

In the first, second, and third embodiments, the interpolation circuit accepts the interpolation direction selected by the diagonal line recognition circuit, and interpolates a pixel value from the values of nearby pixels aligned with the interpolated pixel in this direction. To reduce the chance that an incorrectly selected interpolation direction may be used, the fourth embodiment adds a circuit that recognizes and eliminates anomalous interpolation directions.

Figure 9:
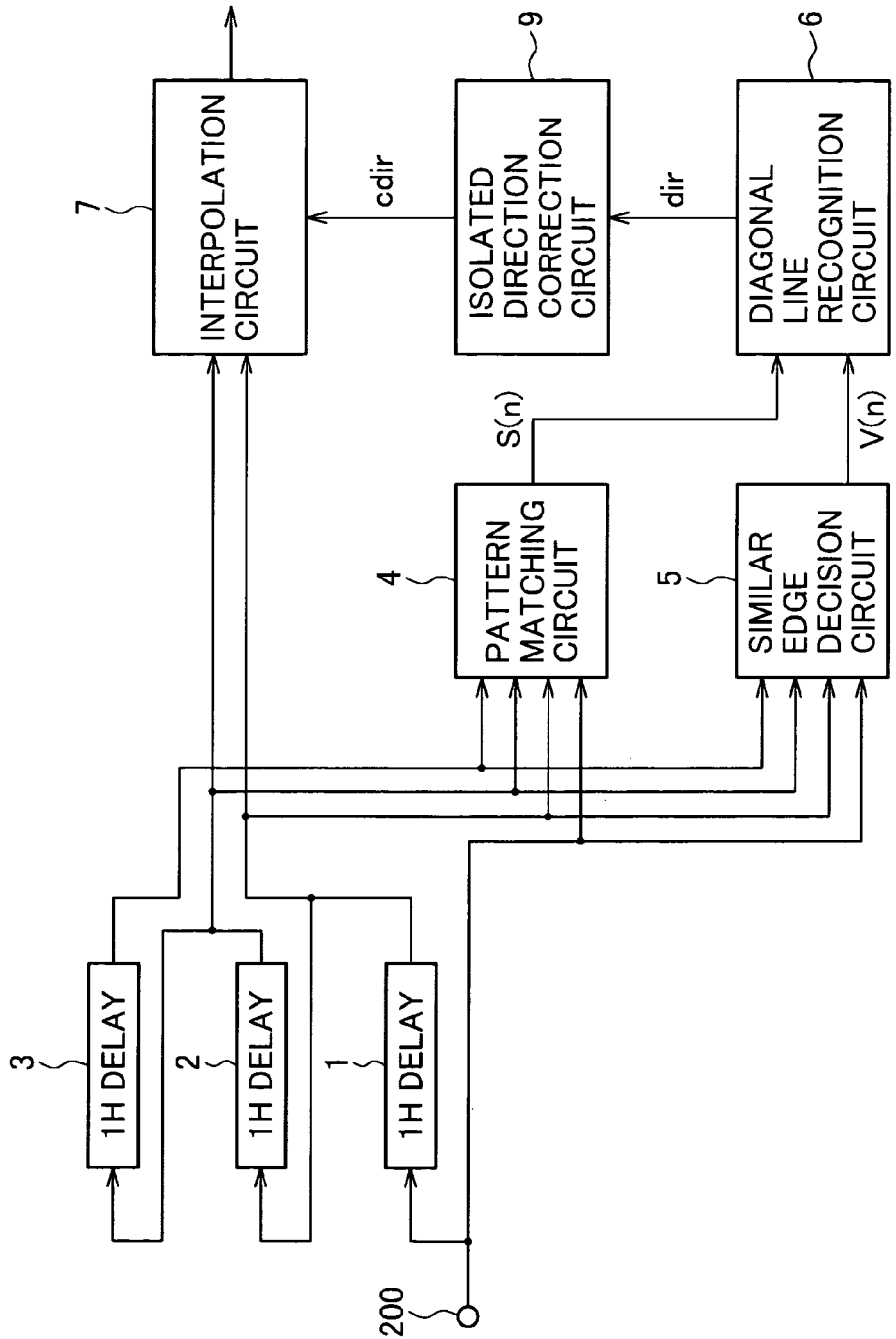
FIG. 9 is a block diagram illustrating a scan line interpolation device according to a fourth embodiment of the invention.

FIG. 9 is a block diagram illustrating the scan line interpolation device in the fourth embodiment. The delay circuits 1, 2, 3, pattern matching circuit 4, similar edge decision circuit 5, diagonal line recognition circuit 6, and interpolation circuit 7 are the same as in the first embodiment and will not be described in detail. An isolated direction correction circuit 9 is inserted between the diagonal line recognition circuit 6 and interpolation circuit 7 to set the interpolation direction to zero unless it is close to the interpolation direction of an adjacent interpolated pixel on the same interpolated scan line.

The diagonal line recognition circuit 6 receives similarity values S(n) from the pattern matching circuit 4 and similar edge decision signals V(n) from the similar edge decision circuit 5, and sets the direction signal (dir) to a value indicating the diagonal line direction accordingly. The isolated direction correction circuit 9 receives the direction signal from the diagonal line recognition circuit 6 and supplies a corrected direction signal (cdir) to the interpolation circuit 7.

The operation of the isolated direction correction circuit 9 will now be described. The isolated direction correction circuit 9 compares the direction signals dir(-1), dir(0), and dir(1) received from the diagonal line recognition circuit 6 for pixels P-1, P0, and P1 on an interpolated scan line by calculating the following absolute differences:

$$dL = |dir(-1) - dir(0)| \quad (30)$$

$$dR = |dir(1) - dir(0)| \quad (31)$$

Then the isolated direction correction circuit 9 decides whether the following conditions 4-1 and 4-2 are satisfied, in which Th1 is a predetermined threshold:

Condition 4-1: $dL \leq Th1$

Condition 4-2: $dR \leq Th1$

If either of these two conditions is satisfied, the isolated direction correction circuit 9 sends the interpolation circuit 7 the direction signal dir(0) provided by the diagonal line recognition circuit 6 for interpolated pixel P0 as the corrected diagonal line direction signal (cdir). If neither of the two conditions is satisfied, the isolated direction correction circuit 9 sends the interpolation circuit 7 a corrected diagonal line direction signal set to zero (cdir=0). The interpolation circuit 7 generates the value P(0) of interpolated pixel P0 in the same was as in the first embodiment, using the corrected direction signal (cdir) instead of the signal (dir) output by the diagonal line recognition circuit 6.

Accordingly, if the interpolation direction selected for an interpolated pixel differs greatly from the interpolation directions of both adjacent interpolated pixels on the same interpolated scan line, the interpolation direction of the interpolated pixel is altered to zero. This prevents the scan line interpolation device of the fourth embodiment from recognizing spurious diagonal lines resulting from noise or the like.

FIFTH EMBODIMENT

The scan line interpolation devices in the first four embodiments generate interpolated pixels from other pixels in the same field. The scan line interpolation device of the fifth embodiment decides whether each interpolated pixel is in a nonmoving part or moving part of the image and performs different types of interpolation accordingly. If the interpolated pixel is in a moving part, intra-field interpolation is used generate the interpolated pixel value as described in the first embodiment. If the interpolated pixel is in a nonmoving part, inter-field interpolation is performed by using the corresponding pixel value from the preceding field.

Figure 10:
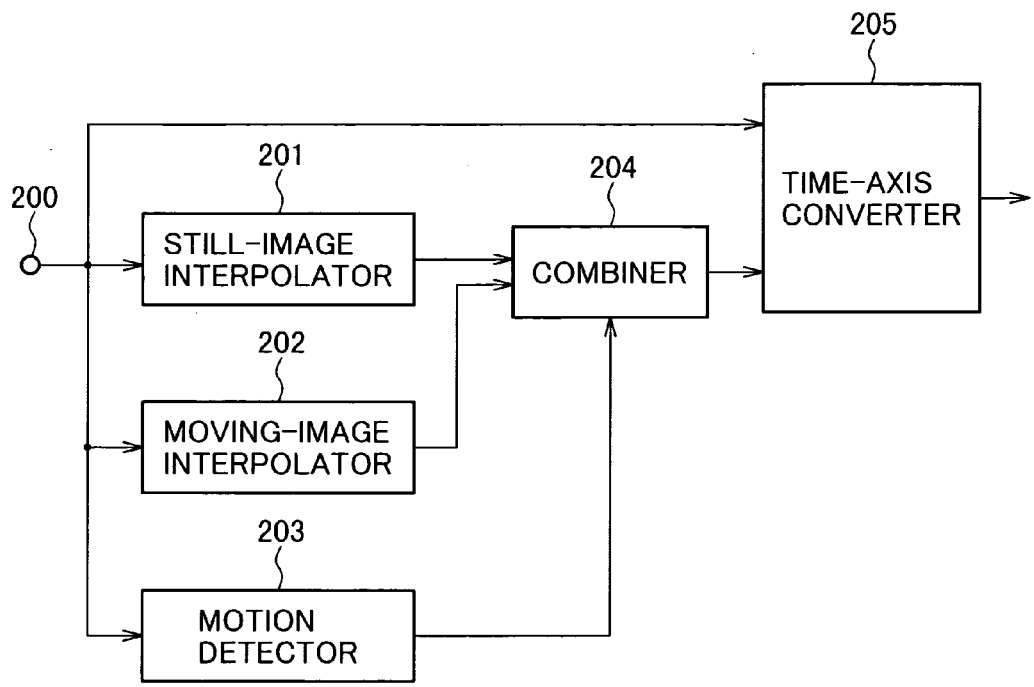
FIG. 10 is a block diagram illustrating a scan line interpolation device according to a fifth embodiment of the invention.

Referring to FIG. 10, the scan line interpolation device according to the fifth embodiment comprises an input terminal 200, a still-image interpolator 201, a moving-image interpolator 202, a motion detector 203, a combiner 204, and a time-axis converter 205.

An interlaced video signal input from the input terminal 200 is supplied to the still-image interpolator 201, moving-image interpolator 202, motion detector 203, and time-axis converter 205. The still-image interpolator 201 has a field memory and generates interpolated pixel values by performing inter-field interpolation, e.g., by interpolating the scan lines of each field between the scan lines of the next field. The moving-image interpolator 202 generates interpolated pixel values by performing intra-field interpolation as described in the first embodiment. The motion detector 203 uses a frame memory to obtain the difference between the input video signal and the video signal for the preceding frame, both fields of which are stored in the frame memory. Motion is detected when the difference is larger than a predetermined threshold, and a motion detection signal is output accordingly.

The interpolated pixel values generated by the still-image interpolator 201 and the moving-image interpolator 202 and the motion detection signal output from the motion detector 203 are supplied to the combiner 204. The combiner 204 combines the two interpolated signals into a single interpolated signal according to the motion detection signal. For parts of the image in which the motion detection signal indicates that motion is present, the combiner 204 outputs the interpolated pixel values generated by the moving-image interpolator 202. For other parts, the combiner 204 outputs the interpolated pixel values generated by the still-image interpolator 201.

The time-axis converter 205 aligns the time axes of the input video signal and the output of the combiner 204, inserts the combined interpolated scan lines generated by the combiner 204 between the scan lines of the input video signal, and outputs a progressively scanned video signal.

The scan line interpolation device of the fifth embodiment generates interpolated pixels by intra-field interpolation in moving parts of an image and by inter-field interpolation in nonmoving parts, so that a high-quality image can be displayed over the whole screen.

The moving-image interpolator 202 may be modified to operate as in the second, third, or fourth embodiment instead of the first embodiment.

SIXTH EMBODIMENT

Figure 11:
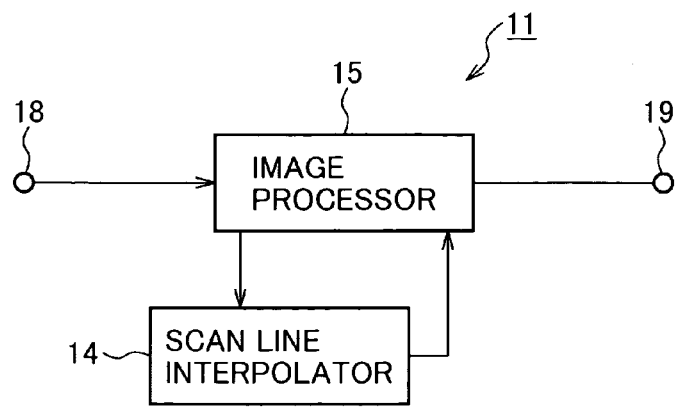
FIG. 11 is a block diagram illustrating an image processing device according to a sixth embodiment of the invention.

The sixth embodiment of the invention is an image processing device having an image adjustment function and a scan line interpolation function. Referring to FIG. 11, the image processing device 11 includes a scan line interpolator 14, an image processor 15, an input terminal 18, and an output terminal 19. The scan line interpolation device of any of first to fifth embodiments may be used as the scan line interpolator 14. The operation of the image processor 15 will be described next.

When an interlaced video signal output from a video signal source such as a digital versatile disc (DVD) player or video cassette recorder (VCR) is supplied from the input terminal 18, the image processor 15 performs image adjustments (for example, edge enhancement, gamma adjustment, and adjustments of screen size, contrast, brightness, color, etc.), and sends the scan line interpolator 14 the adjusted interlaced video signal.

The scan line interpolator 14 interpolates scan lines as described in the preceding embodiments, and supplies the interpolated scan lines to the image processor 15. The image processor 15 inserts the interpolated scan lines into the adjusted interlaced video signal and outputs the resulting progressively scanned signal from the output terminal 19 to an external image display device (not shown).

The image processing device 11 may also include a video reproduction device for reproducing a video signal recorded on a DVD, magnetic tape, hard disk, or the like, and this image reproduction device may supply the interlaced video signal to the input terminal 18.

The image processing device of the sixth embodiment can perform image adjustments and scanning conversion without generating blurred or jagged boundaries and without generating discontinuities in fine lines, even for an image including diagonal lines or edges, or fine lines that make a small angle with the scan lines.

SEVENTH EMBODIMENT

Figure 12:
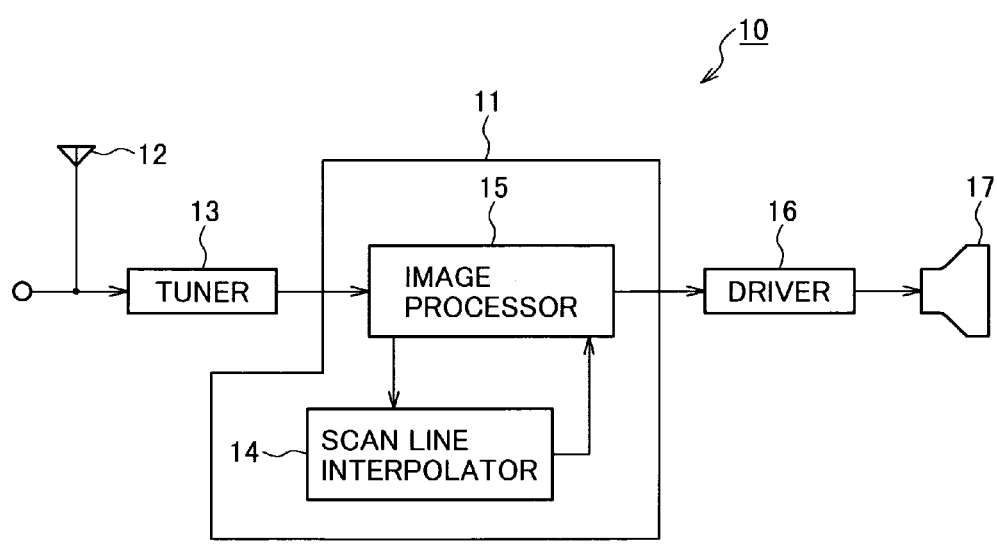
FIG. 12 is a block diagram illustrating an image display device according to a seventh embodiment of the invention.

The seventh embodiment is an image display device that includes an image processing device with a scan line interpolation function and an image adjustment function. As shown in FIG. 12, the image display device 10 includes an image processing device 11, a receiving antenna 12, a tuner 13, a driver 16, and a cathode ray tube (CRT) 17. The image processing device 11 includes an image processor 15 and a scan line interpolator 14 as described in the sixth embodiment. The image display device 10 operates as follows.

The receiving antenna 12 receives a television broadcast signal and supplies it to the tuner 13. The tuner 13 performs tuning, intermediate-frequency amplification, and detection, and supplies an NTSC video signal to the image processing device 11. (NTSC is an interlaced video standard developed by the National Television Systems Committee.) In the image processing device 11, the image processor 15 performs image adjustments (such as edge enhancement, gamma adjustment, and adjustments of screen size, contrast, brightness, color, etc.), and sends the adjusted interlaced video signal to the scan line interpolator 14, as in the sixth embodiment. The scan line interpolator 14 interpolates scan lines as in the sixth embodiment, and supplies the interpolated scan lines to the image processor 15. The image processor 15 then outputs a progressively scanned signal to the driver 16, which drives the CRT 17 to display the image.

The CRT 17 may be replaced by any other type of display device, such as a liquid crystal display (LCD), electroluminescent (EL) display, plasma display panel (PDP), or liquid crystal on silicon (LCOS) display. The tuner 13 is not always necessary; the interlaced video signal may be supplied to the image processor 15 directly from a video signal source such as a DVD player or a VCR.

The image display device of the seventh embodiment can perform image adjustments and scanning conversion and can display pictures without generating blurred or jagged boundaries at diagonal lines or edges and without generating discontinuities in fine lines, even if the image received from the antenna includes, or fine lines forming a small angle with the scan line direction.

The present invention is not limited to the preceding embodiments. A few variations have been mentioned above, and those skilled in the art will recognize that further variations are possible within the scope defined by the appended claims.

What is claimed is:

1. A scan line interpolation device for generating an interpolated pixel on an interpolated scan line from pixels disposed on at least four consecutive scan lines, including at least two scan lines on each side of the interpolated scan line, the scan line interpolation device comprising:
    a pattern matching means for calculating pattern similarity values for a plurality of pixel block pairs, each pixel block pair including two pixel blocks disposed in point-symmetrical positions on opposite sides of the interpolated pixel, each of the two pixel blocks including an identical number of said pixels, the pattern similarity value of each pixel block pair being calculated from values of the pixels in its two constituent pixel blocks;
    a similar edge decision means for deciding whether similar edges are present in corresponding positions in the two pixel blocks constituting each said pixel block pair, on the basis of differences between the pixel values of pixels disposed on mutually adjacent scan lines in one of the pixel blocks, aligned in a direction perpendicular to the scan lines, and differences between the values of pixels disposed in corresponding positions in the other pixel block in the same pixel block pair;
    an interpolation direction decision means for selecting an interpolation direction corresponding to the positions of the two pixel blocks in a pixel block pair having a greatest similarity, as calculated by the pattern matching means, among the pixel block pairs in which the similar edge decision means decides that similar edges are present; and
    an interpolation means for generating the interpolated pixel by using, as reference pixels, the pixels disposed closest to the centers of the two pixel blocks in the pixel block pair corresponding to the interpolation direction selected by the interpolation direction decision means.

2. The scan line interpolation device of claim 1, wherein:
    if there are pixels at the centers of the two pixel blocks in the pixel block pair corresponding to the selected interpolation direction, the interpolation means generates the interpolated pixel by using the two pixels disposed at the centers as reference pixels; and
    if no pixels are disposed at the centers of said two pixel blocks, the interpolation means generates the interpolated pixel by using a plurality of pixels in each of said two pixel blocks as reference pixels.

3. The scan line interpolation device of claim 2, wherein if no pixels are disposed at the centers of the two pixel blocks in the pixel block pair corresponding to the selected interpolation direction, the interpolation means uses, as reference pixels, two pixels closest to the center of each of the two pixel blocks.

4. The scan line interpolation device of claim 1, wherein for each pixel block pair, the pattern matching means calculates absolute values of difference between the values of pixels in mutually corresponding positions in the two pixel blocks constituting the pixel block pair, takes a sum of the calculated absolute values, and outputs the sum as the pattern similarity value of the pixel block pair.

5. The scan line interpolation device of claim 1, wherein for each pixel block pair, the pattern matching means calculates absolute values of difference between the values of pixels in mutually corresponding positions in the two pixel blocks constituting the pixel block pair, takes a sum of the calculated absolute values, weights the sum according to the number of pixels per block, and outputs the sum as the pattern similarity value of the pixel block pair.

6. The scan line interpolation device of claim 1, wherein for each pixel block pair, the pattern matching means calculates absolute values of difference between the values of pixels in mutually corresponding positions in the two pixel blocks constituting the pixel block pair, weights the absolute values, takes a sum of the weighted absolute values, and outputs the sum as the pattern similarity value of the pixel block pair.

7. The scan line interpolation device of claim 1, wherein the similar edge decision means decides that similar edges are present when the following three conditions are all satisfied:
    the difference between the values of two pixels disposed on mutually adjacent scan lines in one constituent pixel block in a pixel block pair, aligned perpendicularly to the scan lines, is greater than a predetermined value;
    the difference between the pixel values of two pixels disposed in corresponding positions in the other constituent pixel block in the same pixel block pair is greater than the predetermined value; and
    the two differences have the same sign.

8. The scan line interpolation device of claim 1, wherein the interpolation direction selected by the interpolation direction decision means is the direction of a line joining the centers of the two pixel blocks in the pixel block pair having the greatest similarity, among the pixel block pairs in which the similar edge decision means decides that similar edges are present.

9. The scan line interpolation device of claim 1, wherein the interpolation direction decision means selects an interpolation direction perpendicular to the scan lines if the direction of a line joining the centers of the two pixel blocks in the pixel block pair having the greatest similarity differs from the direction of a line joining the centers of the two pixel blocks in the pixel block pair having a second greatest similarity, among the pixel block pairs in which the similar edge decision means decides that similar edges are present, by more than a predetermined amount.

10. The scan line interpolation device of claim 1, further comprising an exception decision means for testing for the presence of an edge perpendicular to the scan lines by taking differences between at least the values of the two pixels adjacent to the interpolated pixel in a direction perpendicular to the scan lines and pixels adjacent to said two pixels in the direction of the scan lines, wherein if the exception decision means finds an edge perpendicular to the scan lines, the interpolation direction decision means disregards the pattern similarities calculated by the pattern matching means and the decisions made by the similar edge decision means, and selects the direction perpendicular to the scan lines as the interpolation direction.

11. The scan line interpolation device of claim 1, further comprising an isolated direction correction means for changing the interpolation direction selected by the interpolation direction decision means to a direction perpendicular to the scan lines if said interpolation direction differs by more than a predetermined amount from the interpolation directions selected by the interpolation direction decision means for the adjacent interpolated pixels on both sides of the interpolated pixel on said interpolated scan line.

12. The scan line interpolation device of claim 1, further comprising:
  a still-image interpolator for generating interpolated pixels by performing inter-field interpolation;
  a motion detector for deciding whether an interpolated pixel is included in a nonmoving image part or a moving image part; and
  a combiner for combining the interpolated pixels generated by the still-image interpolator with the interpolated pixels generated by the interpolation means according to the decision made by the motion detector.

13. An image processing device comprising the scan line interpolation device of claim 1, further comprising an image processor for making image adjustments to an input video signal and supplying the adjusted input video signal to the scan line interpolation device.

14. An image display device comprising the image processing device of claim 13, further comprising a display means for displaying an image according to the video signal supplied from the image processor and interpolated pixels generated by the scan line interpolation device in the image processing device.

15. A scan line interpolation method for generating an interpolated pixel on an interpolated scan line from pixels disposed on at least four consecutive scan lines, including at least two scan lines on each side of the interpolated scan line, the method comprising:
  calculating pattern similarity values for a plurality of pixel block pairs, each pixel block pair including two pixel blocks disposed in point-symmetrical positions on opposite sides of the interpolated pixel, each of the pixel blocks including an identical number of said pixels, the pattern similarity value of each pixel block pair being calculated from values of the pixels in its two constituent pixel blocks;
  deciding whether similar edges are present in corresponding positions in the two pixel blocks constituting each said pixel block pair, on the basis of differences between the pixel values of pixels disposed on mutually adjacent scan lines in one of the pixel blocks, aligned in a direction perpendicular to the scan lines, and differences between the values of pixels disposed in corresponding positions in the other pixel block in the same pixel block pair;
  selecting an interpolation direction corresponding to the positions of the two pixel blocks in a pixel block pair having a pattern similarity value indicating greatest similarity, among the pixel block pairs in which similar edges are present; and
  generating the interpolated pixel by using, as reference pixels, the pixels disposed closest to the centers of the two pixel blocks in the pixel block pair corresponding to the selected interpolation direction.

16. The method of claim 15, wherein generating the interpolated pixel further comprises:
  if there are pixels at the centers of the two pixel blocks in the pixel block pair corresponding to the selected interpolation direction, using the two pixels disposed at the centers as reference pixels; and
  if no pixels are disposed at the centers of said two pixel blocks, using a plurality of pixels in each of the two pixel blocks as reference pixels.

* * * * *